(12) United States Patent
Collier et al.

(10) Patent No.: US 11,647,779 B1
(45) Date of Patent: May 16, 2023

(54) WET FOOD PROCESSING SYSTEM AND METHOD OF CLEANING

(71) Applicant: Blue Buffalo Enterprises, Inc., Wilton, CT (US)

(72) Inventors: Matthew Collier, West Alexandria, OH (US); John Wickett, Richmond, IN (US); Benjamin Winchester, Richmond, IN (US)

(73) Assignee: Blue Buffalo Enterprises, Inc., Wilton, CT (US)

( * ) Notice: Subject to any disclaimer, the term of this patent is extended or adjusted under 35 U.S.C. 154(b) by 0 days.

(21) Appl. No.: 17/735,299

(22) Filed: May 3, 2022

(51) Int. Cl.
*A23N 17/00* (2006.01)
*B25B 21/02* (2006.01)
*A23K 50/48* (2016.01)

(52) U.S. Cl.
CPC .............. *A23N 17/00* (2013.01); *A23K 50/48* (2016.05); *B25B 21/02* (2013.01)

(58) Field of Classification Search
CPC ......... A23N 17/00; B25B 21/02; A23K 50/48
See application file for complete search history.

(56) References Cited

U.S. PATENT DOCUMENTS 3,624,830 A * 11/1971 Stehower ............... A23N 17/00
425/313
5,213,026 A * 5/1993 House ..................... A23P 30/20
99/488

* cited by examiner

*Primary Examiner* — Ryan J. Walters
(74) *Attorney, Agent, or Firm* — Diederiks & Whitelaw, PLC; Annette M. Frawley, Esq.

(57) ABSTRACT

A wet food supply apparatus of a wet food processing system includes an outer housing defining an internal cavity, a rotary food processing unit located within the internal cavity during operation of the wet food supply apparatus, and a separation assembly for withdrawing the rotary food processing unit from within the internal cavity for cleaning purposes. The separation assembly includes a threaded rod having a first portion attached to the rotary food processing unit, a second portion rotatably supported by the outer housing for relative rotation, and a third, terminal end portion including a tool mounting member for receiving a drive head of a drive mechanism, such as a portable, battery powered rotary impact tool, for rotating the threaded rod to selectively shift the rotary food processing unit out of the internal cavity of the outer housing to expose the rotary food processing unit.

20 Claims, 2 Drawing Sheets

WET FOOD PROCESSING SYSTEM AND METHOD OF CLEANING

FIELD OF THE INVENTION

The invention generally pertains to the art food processing and, more specifically, to a wet food processing system designed for ease of cleaning.

BACKGROUND OF THE INVENTION

Food manufacturers face many regulatory and practical issues which are unique to their industry, specifically food safety issues, including the need for the regular cleaning of food processing equipment. In mass producing food, the processing equipment generally runs as much as possible to keep up with ever increasing demands. Certainly, a shutdown in one zone of a production line has a ripple effect along the whole line. That is, when producing food products on a commercial scale, various food components are often combined, processed and transported around a factory, with the timing of the overall operation being dependent on the proper operational status for each unit of operation. Like in other industries, down time is inevitable, including the down time associated with basic machinery maintenance. However, in the food art, there exist certain cleaning requirements unique to the industry. For instance, food machinery often needs to be sterilized.

Part of the reason food equipment cleaning requirements can be unique is the materials being handled can create distinct obstacles. In particular, the sticky and/or wet nature of some foods can represent problems in even accessing certain machine components for cleaning purposes, mainly large-scale machine equipment which must be disassembled for cleaning. This issue can be perhaps best exemplified in the production of dog and cat food wherein a wet food supply apparatus includes a rotary food processing unit which must be removed from within an outer housing for periodic cleaning. Many times, removal of the rotary processing unit, even when supported upon rails or the like, can require multiple people to shift the heavy unit to a position which will enable appropriate cleaning access. In certain instances, other machinery, such as a forklift, must actually be used to unstick the processing unit from within the housing. In either case, the effort is time consuming and requires enhanced safety protocol. Therefore, it is considered desirable to provide an effective, safe and efficient system and method for repositioning heavy machinery components used in the wet food processing industry for cleaning purposes.

SUMMARY OF THE INVENTION

In accordance with the invention, a wet food processing system includes a wet food supply apparatus including an outer housing defining an internal cavity, a rotary food processing unit located within the internal cavity during operation of the wet food supply apparatus, and a separation assembly for withdrawing the rotary food processing unit from within the internal cavity for cleaning purposes. The separation assembly includes at least one guide rail supporting the rotary food processing unit for movement relative to the outer housing and a threaded rod having a first portion attached to the rotary food processing unit, a second portion rotatably supported by the outer housing for relative rotation, and a third, terminal end portion. The third terminal end portion is provided with a tool mounting member for receiving a drive head of a portable drive mechanism for rotating the threaded rod, wherein rotation of the threaded rod selectively shifts the rotary food processing unit out of the internal cavity of the outer housing to expose the rotary food processing unit for cleaning.

With this arrangement, the rotary food processing unit can be easily power driven out of the internal cavity for ease of cleaning by one individual in a fraction of a minute. With the threaded rod arrangement, access to the terminal end portion is from an opposite side of the wet food supply apparatus, thereby alleviating certain safety zone issues for on-site operators. In addition, as opposed to the possible incorporation of high torque electric motors as part of the machinery itself, the invention avoids the need for additional safety switches, safety guards and the like, thereby representing a cost effective and eloquent solution to a specific problem.

Additional objects, features and advantages of the invention will become more fully apparent below with reference to the drawings wherein like reference numerals refer to corresponding parts in the several views.

DETAILED DESCRIPTION OF EMBODIMENTS

Figure 1:
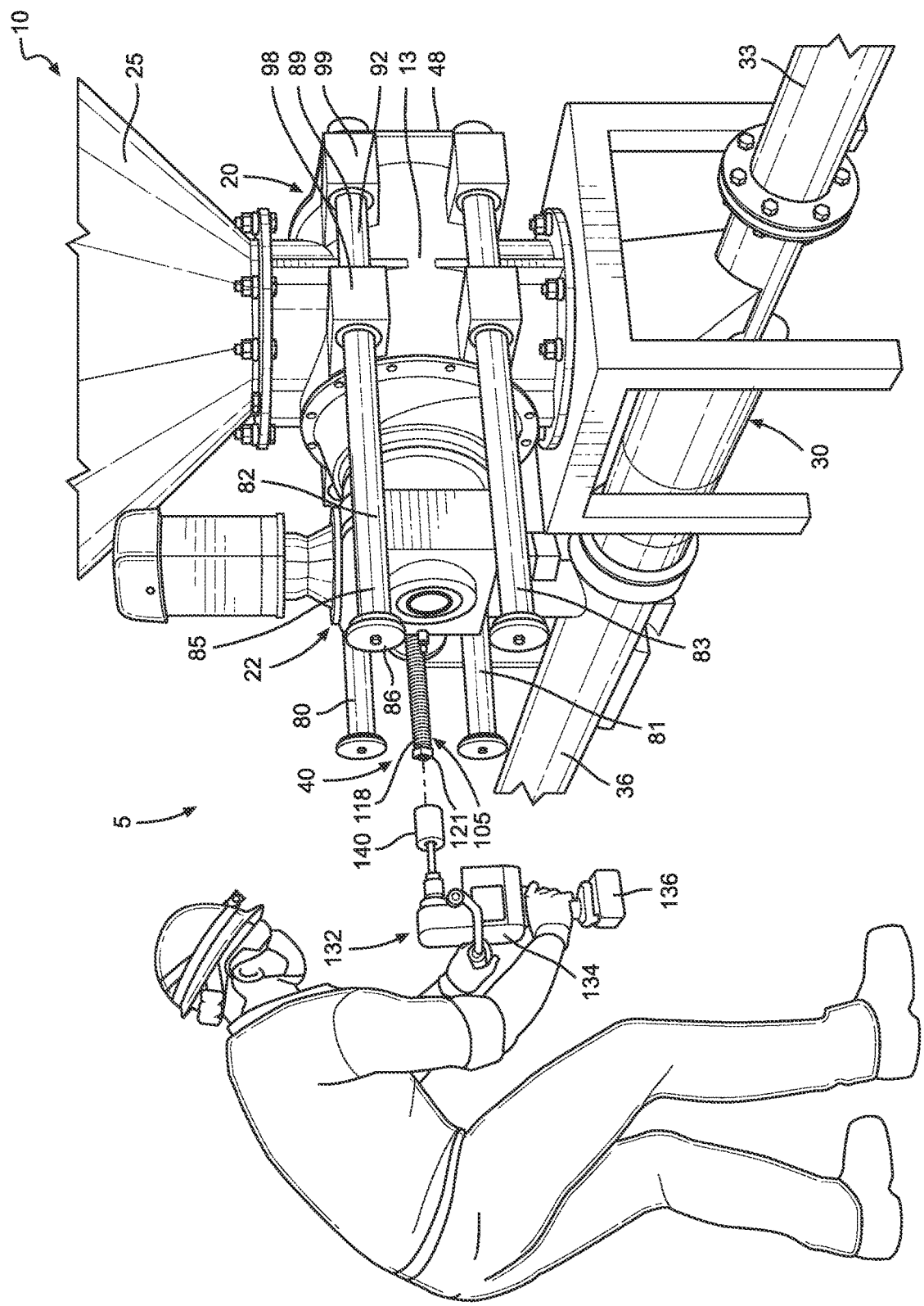
FIG. 1 is a perspective view of a portion of a wet food production line incorporating a wet food supply apparatus having a rotary food processing unit located within an internal cavity of an outer housing during operation of the wet food production line.

With reference to the accompanying drawings, a portion of a food production line is generally indicated at 5. In the embodiment depicted, food production line 5 includes a wet food supply apparatus 10 including an outer housing 13 establishing an internal cavity 16 within which is positioned a rotary food processing unit, generally indicated at 20, which is adapted to be driven by a drive unit 22. Wet food supply apparatus 10 also includes an upper hopper 25 for feeding wet food, such as wet dog or cat food, into rotary food processing unit 20. At this initial point, it should be understood that the term "wet food" in accordance with the invention does not infer that the final product is required to be a wet food product. Instead, what is important is that the invention is employed in a stage of the overall production where food ingredients are actually processed wet, whether through the addition of water or other moisture altering ingredients. This wet processing creates specific issues and a need for cleaning, as discussed above, which are just not of concern in dry food processing systems. Therefore, at least at the point of wet food supply apparatus 10, the processed intermediate product is wet, thereby contributing to the sticky and/or wet issues being addressed. In fact, in a preferred implementation of the invention described in detail below, the actual finished product is a dry pet food having a typical finished moisture range of 5-15% (as compared to a typical finished wet pet food product moisture range of 70-85%) but, at wet food supply apparatus 10, the food supply has added fats and liquid digests, i.e., liquids absorbed into otherwise dry ingredients, resulting in processing moisture levels as high as about 30%.

In the embodiment shown, located below rotary food processing unit 20 is a food transfer unit 30 which takes the form of an elongated tube having an upstream end portion 33 and a downstream end portion 36. Food transfer unit 30 functions to transfer food therethrough based on a pressure differential. In the present case, a vacuum is created which directs food, including the wet food material received from wet food supply apparatus 10, from upstream end portion 33 toward downstream end portion 36. Wet food supply apparatus 10 further includes a separation assembly 40 for use in connection with shifting rotary food processing unit 20 from within internal cavity 16 as will be detailed fully below.

Figure 2:
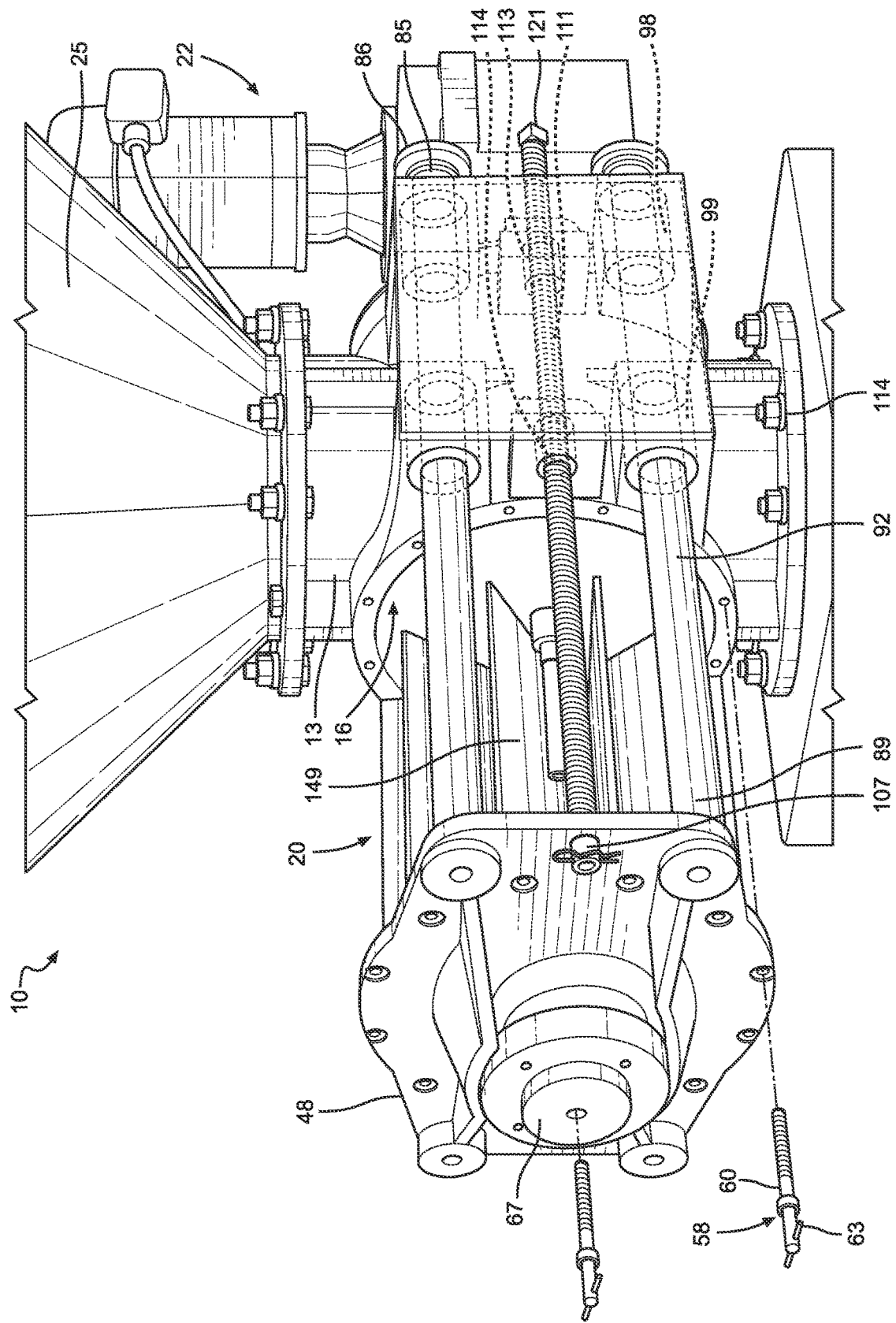
FIG. 2 illustrates the rotary food processing unit shifted out of the internal cavity to expose the rotary food processing unit for cleaning.

As shown in FIG. 2, rotary food processing unit 20 includes an end plate 48 formed with a plurality of circumferentially spaced holes, one of which is indicated at 52. Each hole 52 is aligned with a corresponding threaded hole 53 formed in outer housing 13 and configured to receive a mechanical fastener 58, such as a bolt, which secures end plate 48 directly to outer housing 13. In the embodiment shown, each mechanical fastener 58 (only one of which is shown in exploded view for clarity of the drawing) has an elongated threaded shaft 60 and terminates in a T-shaped handle 63. T-shaped handle 63 is preferably employed for ease of manually gripping and rotating mechanical fastener 58 to either attach or detach end plate 48 to/from outer housing 13. Also in the embodiment shown, rotary food processing unit 20 includes a center access plate 67, having one or more associated mechanical fasteners (not labeled).

Separation assembly 40 includes a plurality of upper and lower guide rails 80-83 for supporting rotary food processing unit 20 for linear movement relative to outer housing 13. Each guide rail 80-83 includes a first end portion 85 terminating in an end cap 86 and a second end portion 89 fixed to end plate 48. Each guide rail 80-83 also includes an intermediate portion 92 which, as perhaps best shown in FIG. 1, is supported by outer housing 13 for linear movement by means of fore-to-aft spaced bearings 98 and 99.

Separation assembly 40 also includes a threaded rod 105, such as a 1½ inch ACME threaded rod, having a first portion 107 attached for relative rotation to end plate 48 (particularly see FIG. 2), a second portion 111 extending through fore-to-aft spaced bushings 113 and 114 supported by outer housing 13, and a third, terminal end portion 118 (FIG. 1). Terminal end portion 118 defines a tool mounting member 121, such as a non-circular socket receiving head, which is adapted to be selectively connected to a drive mechanism 132. In the embodiment depicted, drive mechanism 132 constitutes an impact drill including a main body 134 containing an electric motor (not shown) powered by a battery 136, as well as a drive head 140 which mates with tool mounting member 121.

When it is desired to selectively remove rotary food processing unit 20 from within internal cavity 16 for cleaning, the various mechanical connectors 58 are initially detached from outer housing 13 (manually in the embodiment shown through T-shaped handles 63). Thereafter, as shown in FIG. 1, drive mechanism 132 is positioned such that drive head 140 engages tool mounting member 121. Activation of drive mechanism 132 causes rotation of threaded rod 105, with this rotation being supported by bushings 113 and 114. As threaded rod 105 is rotated, threaded rod 105 linearly shifts relative to outer housing 13 and, given its connection to end plate 48, this movement also causes rotary food processing unit 20 to shift linearly out of internal cavity 16 of outer housing 13, while being supported by guide rails 80-83. FIG. 2 shows rotary food processing unit 20 completely removed from internal cavity 16 and exposed for cleaning. In the embodiment depicted, rotary food processing unit 20 constitutes a rotary valve having a plurality of rotating, circumferentially spaced vanes 149. Between successive vanes 149 are trough areas (not labeled) which receive wet food from within hopper 25 during operation of wet food supply apparatus 10, delivering the wet food to transfer unit 30. At the same time, vanes 149 seal against outer housing 13 and isolate hopper 25 from the pressure differential established with transfer unit 30. In the embodiment shown, drive mechanism 132 is employed to shift rotary food processing unit 20 from the retracted and operational position (FIG. 1) to the fully extended position out of internal cavity 16 (FIG. 2) in less than 30 seconds for ease of cleaning.

Based on the above, it should be clear that a single on-site operator can readily withdraw rotary food processing unit for cleaning in a fraction of a minute. With the threaded rod arrangement, access to the terminal end portion is from an opposite side of the wet food supply apparatus from where rotary food processing unit projects, thereby alleviating safety zone issues for the on-site operator. By using a battery powered, portable drive mechanism, the invention avoids the need for additional safety switches, safety guards and the like which would be required with the use of built-in electric or fluid motor system. Therefore, with the overall simplicity of construction, ease of operation and resulting lack of the need for additional safety measures, the overall invention represents a cost effective and eloquent solution to a specific problem in dealing with cleaning rotary wet food processing units. Still, although described with respect to a preferred embodiment of the invention, it should be understood various changes and/or modifications can be made to the invention without departing from the spirit thereof. For instance, it has been found that the threaded rod can actually retain rotary food processing unit within the internal cavity during operation of the production line such that, if desired, the mechanical connectors securing the end plate to the outer housing need not be employed. In addition, although the disclosed embodiment employs the invention in connection with exposing a rotary valve for cleaning, it should be recognized that the invention can be employed to perform a corresponding function for various rotary food industry machines, including mixers, screw extruders and the like. In any case, the invention is only intended to be limited by the scope of the following claims.

The invention claimed is:

1. A wet food processing system comprising:
   a wet food supply apparatus including an outer housing defining an internal cavity, a rotary food processing unit located within the internal cavity during operation of the wet food supply apparatus, and a separation assembly for withdrawing the rotary food processing unit from within the internal cavity for cleaning purposes, said separation assembly including:
   at least one guide rail supporting the rotary food processing unit for movement relative to the outer housing; and
   a threaded rod having a first portion attached to the rotary food processing unit, a second portion rotatably supported by the outer housing for relative rotation, and a third, terminal end portion, said third terminal end portion including a tool mounting member for receiving a drive head of a drive mechanism for rotating the threaded rod to selectively shift the rotary food processing unit out of the internal cavity of the outer housing to expose the rotary food processing unit for cleaning.

2. The wet food processing system of claim 1, further comprising a pneumatic transfer unit configured to receive wet food from the wet food supply apparatus.

3. The wet food processing system of claim 2, wherein the wet food supply apparatus further includes a hopper arranged above the internal cavity for introducing food into the rotary food processing unit.

4. The wet food processing system of claim 3, wherein the rotary food processing unit constitutes a rotary valve configured to systematically dispense the wet food to the pneumatic transfer unit.

5. The wet food processing system of claim 4, wherein the pneumatic transfer unit is at a pressure distinct from the hopper, said rotary valve including a plurality of spaced vanes which isolate the hopper from the pressure of the pneumatic transfer unit.

6. The wet food processing system of claim 1, wherein the rotary food processing unit is configured to be linearly shifted out of the internal cavity of the outer housing while being supported by the at least one guide rail.

7. The wet food processing system of claim 6, wherein the wet food supply apparatus further includes an end plate which is part of the rotary food processing unit, the first portion of the threaded rod being attached to the rotary food processing unit directly at the end plate.

8. The wet food processing system of claim 7, wherein the wet food supply apparatus further includes a plurality of mechanical fasteners connecting the end plate directly to the outer housing.

9. The wet food processing system of claim 1, further comprising at least one bearing rotatably supporting the second portion of the threaded rod from the outer housing.

10. The wet food processing system of claim 1, further comprising a battery powered, portable rotary impact tool having a drive head which mates with the tool mounting member of the third terminal end portion of the threaded rod.

11. A method of preparing a wet food supply apparatus of a wet food processing system for cleaning, with the wet food supply apparatus including an outer housing defining an internal cavity, a rotary food processing unit located within the internal cavity during operation of the wet food supply apparatus, and a separation assembly for withdrawing the rotary food processing unit from within the internal cavity for cleaning purposes, said method comprising:
attaching a drive head of a drive mechanism to a tool mounting member of a threaded rod of the separation assembly, with the threaded rod having a first portion attached to the rotary food processing unit, a second portion rotatably supported by the outer housing for relative rotation, and a third end portion including the tool mounting member; and
activating the drive mechanism to rotate the threaded rod to cause the rotary food processing unit to shift out of the internal cavity of the outer housing, while supporting the rotary food processing unit upon at least one guide rail for movement relative to the outer housing, to expose the rotary food processing unit for cleaning.

12. The method of claim 11, further comprising, during operation of the wet food processing system, directing wet food from the rotary food processing unit to a pneumatic transfer unit.

13. The method of claim 12, further comprising, during operation of the wet food processing system, introducing food into the rotary food processing unit through a hopper arranged above the internal cavity.

14. The method of claim 13, wherein the rotary food processing unit constitutes a rotary valve which, during operation of the wet food processing system, systematically dispenses the wet food to the pneumatic transfer unit.

15. The method of claim 14, wherein the rotary valve includes a plurality of spaced vanes, said method further comprising, during operation of the wet food processing system, isolating a pressure of the pneumatic transfer unit from the hopper with the plurality of spaced vanes.

16. The method of claim 11, further comprising linearly shifting the rotary food processing unit, while supported by the at least one guide rail, out of the internal cavity of the outer housing.

17. The method of claim 16, wherein the wet food supply apparatus further includes an end plate which is part of the rotary food processing unit and the first portion of the threaded rod is attached to the rotary food processing unit directly at the end plate, said threaded rod linearly shifting with the rotary food processing unit upon rotating the threaded rod.

18. The method of claim 17, further comprising removing a plurality of mechanical fasteners connecting the end plate directly to the outer housing prior to rotating the threaded rod to cause the rotary food processing unit to shift out of the internal cavity of the outer housing.

19. The method of claim 11, further comprising rotatably supporting the second portion of the threaded rod from the outer housing within at least one bearing.

20. The method of claim 11, further comprising employing a battery powered, portable rotary impact tool having a drive head which mates with the tool mounting member of the third terminal end portion of the threaded rod as the drive mechanism used to rotate the threaded rod to cause the rotary food processing unit to shift out of the internal cavity of the outer housing.

\* \* \* \* \*